United States Patent [19]

Warner

[11] Patent Number: 4,514,616

[45] Date of Patent: Apr. 30, 1985

[54] SAFETY MOUNTING DEVICE

[75] Inventor: Michael V. Warner, Brampton, Canada

[73] Assignee: Rumble Equipment Limited, Rexdale, Canada

[21] Appl. No.: 649,529

[22] Filed: Sep. 11, 1984

[51] Int. Cl.³ .............................................. B23K 9/28
[52] U.S. Cl. ..................................... 219/136; 901/42; 901/49
[58] Field of Search ................... 219/136, 124.34, 132; 248/573, 658, 662; 901/42, 11, 13, 49

[56] References Cited

U.S. PATENT DOCUMENTS

| | | |
|---|---|---|
| 2,879,960 | 3/1959 | Mortimer . |
| 2,914,988 | 12/1959 | O'Shei . |
| 3,193,628 | 7/1965 | Wanlass . |
| 3,223,791 | 12/1965 | Wanlass . |
| 3,763,344 | 10/1973 | Okabe et al. . |
| 3,889,915 | 6/1975 | Hashiguchi et al. . |
| 4,308,434 | 12/1981 | Roeser . |
| 4,389,561 | 6/1983 | Weman et al. ........................ 901/42 |
| 4,439,665 | 3/1984 | Arter .................................... 219/136 |

FOREIGN PATENT DOCUMENTS

| | | | |
|---|---|---|---|
| 5736073 | 7/1980 | Japan .................................. 219/132 |
| 2118524 | 11/1983 | United Kingdom ........... 219/124.34 |
| 844261 | 7/1981 | U.S.S.R. ................................ 901/49 |

Primary Examiner—Clifford C. Shaw
Attorney, Agent, or Firm—Sim & McBurney

[57] ABSTRACT

A safety mounting device includes two movable members mounted within a housing, the second movable member being sandwiched between the first movable member and a stop member and the first movable member being biased against the second movable member. Both movable members are movable along the longitudinal axis of the housing with the second movable member also being capable of tilting with respect to that longitudinal axis and rotating with respect to that longitudinal axis. The engagement between the two movable members is of a cam surface-cam follower nature. Movement of the second movable member along the longitudinal axis towards the first movable member, rotation of the second movable member from its home position and tilting of the second movable member relative to the longitudinal axis all cause the first movable member to be displaced from its home position along the longitudinal axis. This displacement can be used to trigger a switch for control purposes.

6 Claims, 5 Drawing Figures

SAFETY MOUNTING DEVICE

BACKGROUND OF THE INVENTION

This invention relates to a safety mounting device that may be used for mounting a member that is subject to various external forces, the safety mounting device functioning to prevent the member from being damaged if the forces should become excessive. The safety mounting device of the present invention was designed for use in robotic welding applications to mount a welding torch and will be described herein in such an environment. Those skilled in the art will appreciate, however, that this is only one of many applications to which the safety mounting device of the present invention may be put.

When a robot is used for arc welding applications, it is almost inevitable that, occasionally, the welding torch will strike some obstruction. This can be due to a variety of reasons, chief among them being operator error and equipment malfunction. Should such a collision occur, it is imperative that the robot be stopped immediately to prevent damage. Most robots can be fitted with torch contact circuits which trip the robot control in the event of the torch contacting any grounded metallic object. However, if the robot is moving at a reasonable speed, damage will occur before the robot can be stopped. Furthermore, such torch contact circuits are subject to frequent nuisance tripping as a result of weld spatter buildup, the presence of ionised gases, etc.

Even a minor collision of the torch usually results in a certain amount of displacement, requiring time-consuming reprogramming of the robot. More violent collisions can result in serious damage, not only to the welding torch, but also to the mechanical elements of the robot itself.

Various desirable characteristics of a safety mounting device for use in robotic welding applications are as follows:

1. The safety mounting device should be flexible, having compliance in as many planes as possible.
2. The force required to displace the safety mounting device should be less than that which would cause damage to the robot.
3. The safety mounting device should return to its preset position (home position) with repeatable accuracy upon removal of the obstruction or external force.
4. The force required to displace the safety mounting device should be greater than that imposed on the welding torch by the constraints of the attached welding cables, hoses, etc. during normal operation of the robot.
5. The safety mounting device should be fitted with some means of indicating abnormal displacement to the robot control so that the robot can be stopped before the safety mounting device has reached the limit of its displacement.
6. The safety mounting device should be capable of withstanding the ambient conditions existing near an arc welding operation, such as high temperature, smoke, weld spatter, ozone and high levels of ultra violet and beta radiation.
7. The safety mounting device should be of rugged construction.
8. The safety mounting device should be of minimal weight so as not to compromise the dynamic performance of the robot.

In accordance with a preferred embodiment of this invention there is provided a safety mounting device having all of the desirable characteristics noted above.

SUMMARY OF THE INVENTION

An aspect of this invention is as follows:

A safety mounting device comprising a housing having a longitudinal axis; a first movable member mounted within said housing for sliding movement along said longitudinal axis; a second movable member mounted within said housing between said first movable member and a stop member, said second movable member being mounted within said housing for sliding movement along said longitudinal axis, for rotation about said longitudinal axis and for tilting movement with respect to said longitudinal axis; biasing means for biasing said first movable member against said second movable member to sandwich said second movable member between said first movable member and a stop member; and switch means having an on position and an off position and operable by said first movable member, in one position of said first movable member along said longitudinal axis said switch means being in one of its two positions, in other positions of said first movable member along said longitudinal axis said switch means being in the other of its two positions; said first and second movable members contacting each other by means of a cam surface and a cam follower surface such that rotation of said second movable member about said longitudinal axis from a home position wherein said first movable member is in its said one position displaces said first movable member by cam surface-cam follower action to said other positions thereof, said first movable member also being movable from said one position thereof to said other positions thereof by virtue of movement of said second movable member along said longitudinal axis toward said first movable member and by virtue of tilting of said second movable member relative to said longitudinal axis.

BRIEF DESCRIPTION OF THE DRAWINGS

This invention will become more apparent from the following detailed description, taken in conjunction with the appended drawings, in which.

DETAILED DESCRIPTION OF THE INVENTION INCLUDING THE PREFERRED EMBODIMENT

Figure 1:
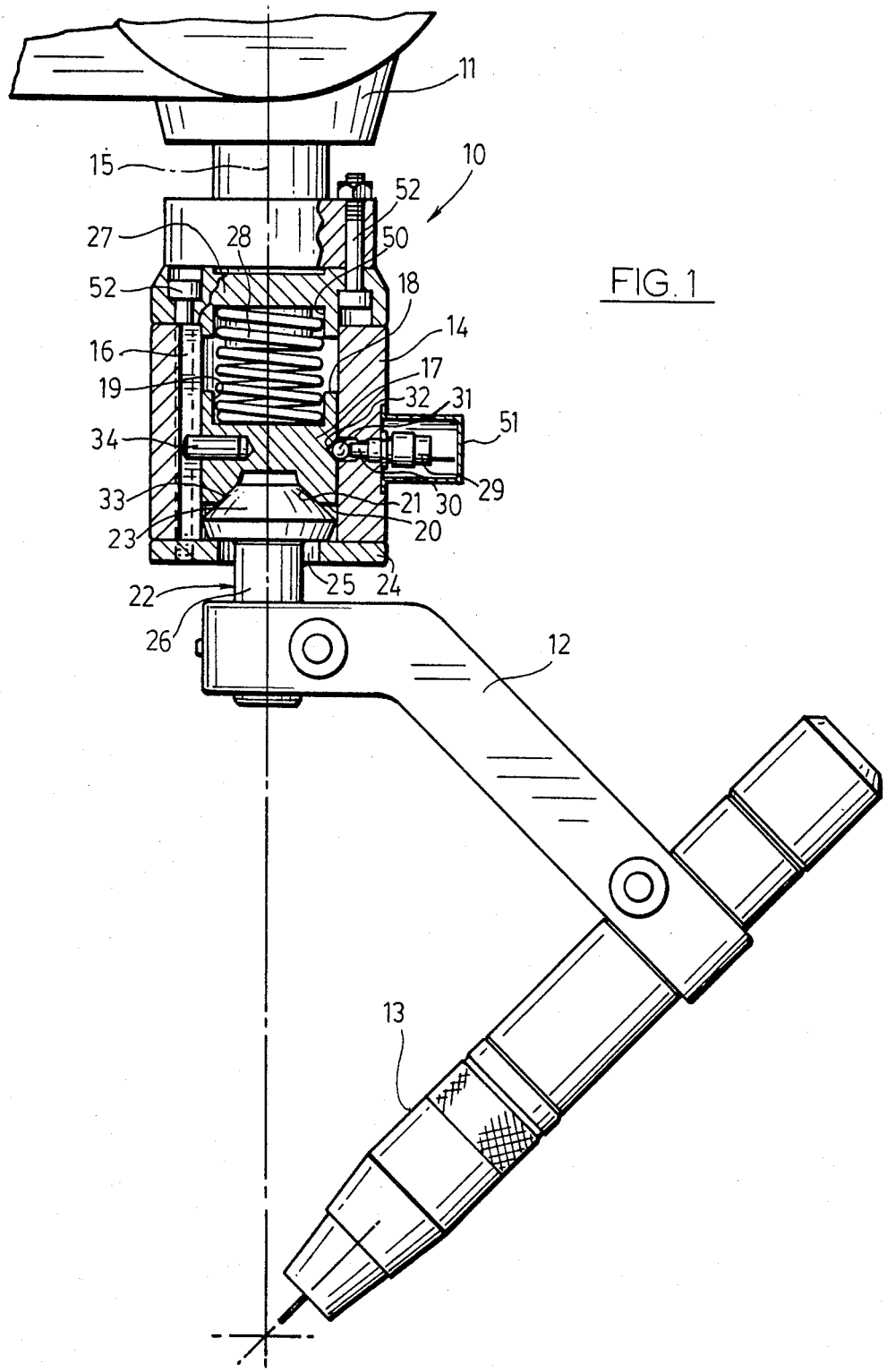
FIG. 1 is a front elevation, partly broken away, showing a safety mounting device embodying the present invention, a part of a robot to which the safety mounting device is secured, a welding torch bracket mounted on the safety mounting device and a welding torch supported by the aforementioned bracket.

A safety mounting device 10 constituting a preferred embodiment of the invention is shown in the drawings.

It is secured to a robot 11, only a part of which is shown, since the robot forms no part of the instant invention, and carries or mounts a mounting bracket 12 on which, in turn, is mounted a welding torch 13.

Safety mounting device 10 includes a housing 14 having a longitudinal axis 15. Housing 14 may be fabricated from aluminum, for example, and, in the illustrated embodiment, simply is a hollow cylinder. A straight slot or channel 16 running parallel to longitudinal axis 15 is provided in the inner side wall of housing 14 for a purpose which will become more apparent hereinafter.

Mounted within housing 14 is a movable member 17 that functions like a piston within housing 14. It is cylindrical in configuration, bears against the inner side wall of housing 14 and is movable along longitudinal axis 15. The upper end surface 18 of movable member 17 is provided with a cylindrical recess 19. The lower end surface 20 of movable member 17 is provided with a cam follower surface 21 which, in the illustrated embodiment, is of V-shaped configuration.

Figure 2:
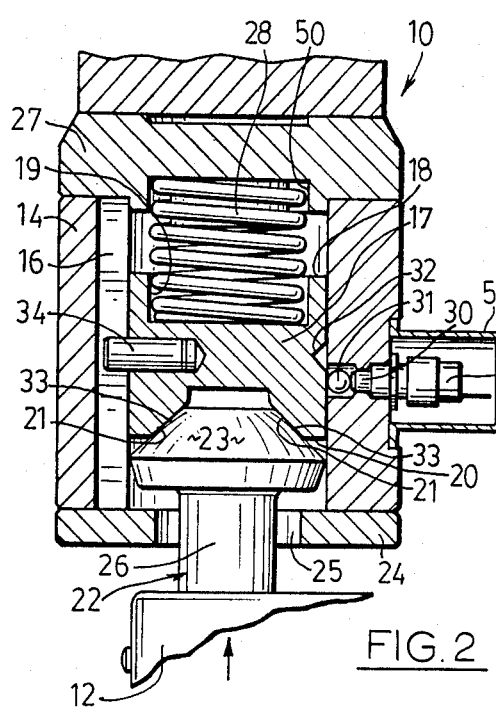
FIGS. 2, 3 and 4 are front elevational views, partly broken away, of a safety mounting device of the type shown in FIG. 1 and showing various positions of the components thereof, these figures being useful in describing the operation of the safety mounting device.
Figure 3:
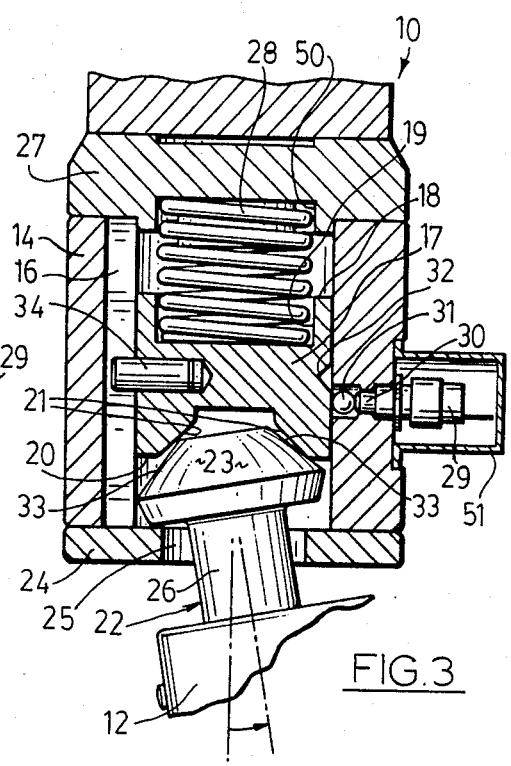
Figure 4:
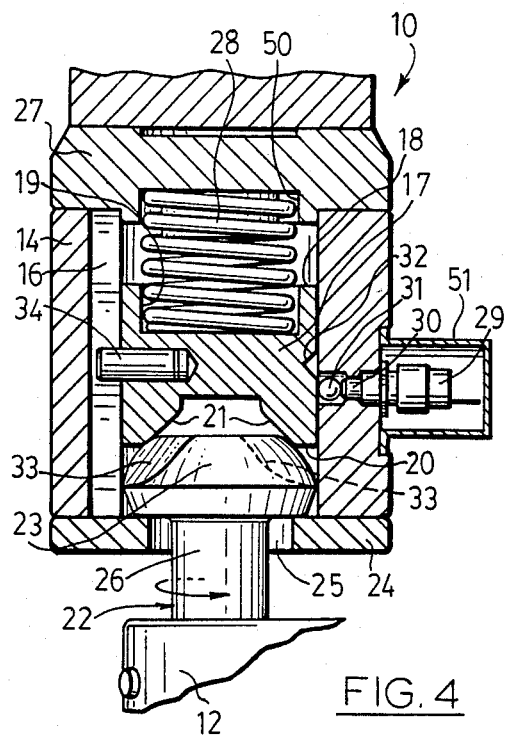
Figure 5:
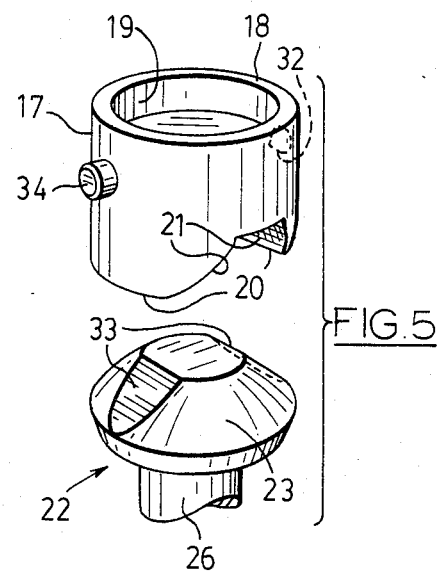
FIG. 5 is a perspective view of several of the components of a safety mounting device embodying the present invention.

A second movable member 22 is mounted within housing 14, a part 23 thereof being sandwiched between movable member 17 and a stop member 24. Stop member or retaining plate 24 simply is of annular configuration, preferably is fabricated of aluminum and is secured to housing 14 in any suitable way, e.g., by threaded fasteners. It has an enlarged opening 25 to accommodate a stem 26 of movable member 22 formed integral with part 23 and which extends out of housing 14 through opening 25. Movable member 22 is mounted within housing 14 for movement along longitudinal axis 15, for rotation about longitudinal axis 15 and for tilting movement with respect to longitudinal axis 15 as shown in FIGS. 2, 4 and 3 respectively.

Secured to the opposite end of housing 14 from stop member 24 is a cover plate 27 that is generally disc-shaped. Cover plate 27 preferably is constructed of aluminum and may be secured to robot 11 and to housing 14 by any suitable means, e.g., threaded fasteners. The lower end surface of cover plate 27 is recessed at 50 in the same way that upper surface 18 of movable member 17 is recessed at 19.

Cover plate 27, housing 14 and retaining plate 24 may be held together by bolts 52 whose heads are recessed within cover plate 27 and which extend through channels bored in housing 14 and threadably engage retaining plate 24.

Movable member 17 is biased against movable member 22 by means of a spring 28 which sandwiches part 23 of movable member 22 between lower end surface 20 of movable member 17 and stop member 24. Spring 28 is compressed between cover plate 27 and movable member and has its free ends mounted in recesses 19 and 50.

A switch 29 is mounted on housing 14 and has an on position and an off position. A protective cover 51 is secured in position over switch 29. Generally speaking, switch 29 is operable by movable member 17 such that in one position (the home position) of movable member 17 along longitudinal axis 15, switch 29 will be in one of its two positions, i.e., either on or off, while in other positions of movable member 17 along longitudinal axis 15, switch 29 will be in the other of its two positions, i.e., either off or on respectively. In the illustrated embodiment this operation of switch 29 is achieved by means of a switch operator 30 extending part way through housing 14 and engaging a ball 31 which, in the home position of movable member 17, is located in a detent 32 in the side wall of movable member 17. Any displacement of movable member 17 along longitudinal axis 15 from its home position shown in FIG. 1 results in ball 31 being moved into engagement with switch operator 30 to change the position of switch 29, all as is clearly shown in FIGS. 2, 3 and 4. Of course, the illustrated technique for operating switch 29 is merely one of many different techniques that may be used without departing from this invention.

Mounted within an opening in movable member 17 is a pin 34 that protrudes into slot 16. Pin 34 and slot 16 merely cooperate with one another to ensure that, in the home position of the components, ball 31 will rest in detent 32. This also could be achieved by making detent 32 of annular configuration so that in the home position of movable member 17, ball 31 would rest in detent 32 regardless of any rotation of member 17 that might take place about longitudinal axis 15.

As previously noted, lower end surface 20 of movable member 17 is constituted, in part, by a cam follower surface 21. The upper surface of part 23 of movable member 22 is a cam surface 33. Cam surface 33 is of generally conical configuration but with two flats that incline toward each other making a generally V-shaped configuration that nests within cam follower surface 21 in the home position of movable member 17.

Thus, in the home position of the various components cam surface 33 nests within cam follower sufface 21, and switch 29 is in one of its two positions, switch operator 30 not having been activated by ball 31.

When a force tending to laterally displace welding torch 13 is applied to welding torch 13, movable member 22 tilts with respect to longitudinal axis 15, as shown in FIG. 3, resulting in movable member 22 displacing movable member 17 upwardly along longitudinal axis 15, as shown in FIG. 3 and causing switch 29 to be tripped to its other position.

If a direct upward force should be applied to welding torch 13, as shown by the arrow in FIG. 2, movable member 22 will move along longitudinal axis 15 causing upward displacement of movable member 17 and again tripping switch 29.

When a rotary (with respect to longitudinal axis 15) force is applied to welding torch 13, the engagement of cam surface 33 with cam follower surface 21 results in upward displacement of movable member 17 along longitudinal axis 15, as shown in FIG. 4, again resulting in tripping of switch 29.

It will be seen from the foregoing that when movable member 22 is deflected in any lateral direction, is displaced upwardly along longitudinal axis 15 or is rotated relative to longitudinal axis 15, the result is that movable member 17 is displaced from its home position (FIG. 1) and switch 29 is moved from its on or off position when movable member 17 is in its home position to an off or on position respectively when movable member 17 is displaced away from its home position. Switch 29 is connected, of course, to the control (not shown) for robot 11 and causes the robot to trip before any damage can occur to it resulting from the unnatural displacement of welding torch 13.

Upon removal of the external forces acting on welding torch 13, the pressure of spring 28 returns all components to the home position shown in FIG. 1.

If desired a gauge (not shown) may be removably mounted on stem 26 of movable member 22 to facilitate mounting of welding torch 13 so that its electrode just reaches longitudinal axis 15.

While a preferred embodiment of the invention has been disclosed herein, those skilled in the art will appreciate that changes and modifications may be made therein without departing from the spirit and scope of this invention as defined in the appended claims.

What is claimed is:

1. A safety mounting device comprising a housing having a longitudinal axis; a first movable member mounted within said housing for sliding movement along said longitudinal axis; a second movable member mounted within said housing between said first movable member and a stop member, said second movable member being mounted within said housing for sliding movement along said longitudinal axis, for rotation about said longitudinal axis and for tilting movement with respect to said longitudinal axis; biasing means for biasing said first movable member against said second movable member to sandwich said second movable member between said first movable member and a stop member; and switch means having an on position and an off position and operable by said first movable member, in one position of said first movable member along said longitudinal axis said switch means being in one of its two positions, in other positions of said first movable member along said longitudinal axis said switch means being in the other of its two positions; said first and second movable members contacting each other by means of a cam surface and a cam follower surface such that rotation of said second movable member about said longitudinal axis from a home position wherein said first movable member is in its said one position displaces said first movable member by cam surface-cam follower action to said other positions thereof, said first movable member also being movable from said one position thereof to said other positions thereof by virtue of movement of said second movable member along said longitudinal axis toward said first movable member and by virtue of tilting of said second movable member relative to said longitudinal axis.

2. A safety mounting device according to claim 1 wherein said biasing means is a spring.

3. A safety mounting device according to claim 1 wherein said cam surface is on said second movable member and said cam follower surface is on said first movable member.

4. A safety mounting device according to claim 1 wherein said cam surface and said cam follower surface are generally V-shaped nesting surfaces.

5. A safety mounting device according to claim 4 wherein said cam surface is on said second movable member and said cam follower surface is on said first movable member.

6. A safety mounting device according to claim 1 including a welding torch mounting bracket and means for securing said bracket to said second movable member.

* * * * *